United States Patent
Jia

(10) Patent No.: US 11,929,777 B2
(45) Date of Patent: Mar. 12, 2024

(54) TIME SYNCHRONIZATION METHOD AND APPARATUS

(71) Applicant: Huawei Technologies Co., Ltd., Shenzhen (CN)

(72) Inventor: Xiaolin Jia, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 195 days.

(21) Appl. No.: 17/692,801

(22) Filed: Mar. 11, 2022

(65) Prior Publication Data

US 2022/0200653 A1 Jun. 23, 2022

Related U.S. Application Data

(63) Continuation of application No. PCT/CN2020/101113, filed on Jul. 9, 2020.

(30) Foreign Application Priority Data

Sep. 12, 2019 (CN) .......................... 201910866525.6

(51) Int. Cl.
*H04B 1/7073* (2011.01)
*H04B 1/69* (2011.01)

(52) U.S. Cl.
CPC ... *H04B 1/7073* (2013.01); *H04B 2001/6908* (2013.01); *H04B 2201/7073* (2013.01)

(58) Field of Classification Search
CPC .......... H04B 1/7073; H04B 2001/6908; H04B 2201/7073; H04J 3/0638; H04J 3/0635; H04J 3/0661; G04R 40/06
See application file for complete search history.

(56) References Cited

U.S. PATENT DOCUMENTS

| 8,867,520 B2 * | 10/2014 | Nicholls ........... H04W 56/0015 |
| | | 455/260 |
| 9,088,390 B1 | 7/2015 | Wheelock |
| 9,549,294 B2 * | 1/2017 | Yang ...................... H04W 4/06 |
| 2015/0346760 A1 | 12/2015 | Kishiro et al. |
| 2016/0099803 A1 | 4/2016 | Achanta et al. |
| 2016/0223677 A1 | 8/2016 | Trevino et al. |
| 2018/0322388 A1 * | 11/2018 | O'Shea ................. H04L 1/0033 |
| 2022/0200653 A1 | 6/2022 | Jia |
| 2023/0327831 A1 * | 10/2023 | Xu ........................ H04L 5/0051 |
| | | 370/329 |

FOREIGN PATENT DOCUMENTS

| CN | 101442799 A | 5/2009 |
| CN | 101582790 A | 11/2009 |
| CN | 105388751 A | 3/2016 |

(Continued)

*Primary Examiner* — Dac V Ha
(74) *Attorney, Agent, or Firm* — Conley Rose, P.C.

(57) ABSTRACT

A time synchronization method and apparatus includes determining a time difference between reference time and system time of an artificial intelligence device, where the reference time is timed by an internal clock of the artificial intelligence device and is aligned based on a satellite timing signal, or the reference time is timed by an internal clock of the artificial intelligence device; and adjusting the system time based on a preset step value if the time difference is greater than a preset value.

20 Claims, 8 Drawing Sheets

(56) References Cited

FOREIGN PATENT DOCUMENTS

| | | |
|---|---|---|
| CN | 106712884 A | 5/2017 |
| CN | 107222281 A | 9/2017 |
| CN | 109283829 A | 1/2019 |
| CN | 109687868 A | 4/2019 |
| CN | 110061797 A | 7/2019 |
| CN | 110620632 A | 12/2019 |

* cited by examiner

TIME SYNCHRONIZATION METHOD AND APPARATUS

CROSS-REFERENCE TO RELATED APPLICATIONS

This application is a continuation of International Application No. PCT/CN2020/101113, filed on Jul. 9, 2020, which claims priority to Chinese Patent Application No. 201910866525.6, filed on Sep. 12, 2019. The disclosures of the aforementioned applications are hereby incorporated by reference in their entireties.

TECHNICAL FIELD

This application relates to the artificial intelligence field, and in particular, to a time synchronization method and apparatus.

BACKGROUND

With rapid development of artificial intelligence technologies, an artificial intelligence device emerges. Intelligent control is a key technology in a working process of the artificial intelligent device (for example, an intelligent vehicle, a robot, and an intelligent ship). Accuracy of time synchronization determines reliability of intelligent control.

For example, a sensor timestamp, sensor data fusion, positioning accuracy compensation, planning decision making, and the like in intelligent control all strongly depend on system time. Therefore, an intelligent control process has a higher requirement for time synchronization.

Currently, a time synchronization process in intelligent control is as follows. A Global Navigation Satellite System (GNSS) module in an intelligent control system receives a satellite timing signal, and obtains accurate time by using the satellite timing signal; and a system time management module uses, as system time, the accurate time obtained by using the satellite timing signal, and completes time synchronization to ensure time accuracy.

When the artificial intelligence device is in a blocking scenario such as a tunnel or a city canyon, the GNSS module cannot obtain the satellite timing signal. In this case, the system time management module uses time of an internal clock as system time for intelligent control. If the satellite timing signal has been lost for a relatively long time, there is a relatively large time difference between the time of the internal clock and time of a satellite due to insufficient accuracy of the internal clock. Therefore, when the GNSS module re-obtains the satellite timing signal, if accurate time obtained by using the satellite timing signal is directly used as the system time, the system time hops. Once the system time hops, stability of intelligent control is severely affected. For example, there is a case in which a sensor loses a frame, fused data cannot be matched, positioning is inaccurate, or an exception occurs in planning control. Consequently, running of the artificial intelligent device is abnormal.

SUMMARY

This application provides a time synchronization method and apparatus, to improve accuracy of time synchronization in the artificial intelligence field and improve stability of intelligent control.

To achieve the foregoing objective, the following technical solutions are used in this application.

According to a first aspect, a time synchronization method is provided and is applied to a time synchronization apparatus in an artificial intelligence device. The method may include determining a time difference between reference time and system time of the artificial intelligence device, where the reference time is timed by an internal clock of the artificial intelligence device and is aligned based on a satellite timing signal, or the reference time is timed by an internal clock of the artificial intelligence device; and adjusting the system time based on a preset step value if the time difference is greater than a preset value.

According to the time synchronization method provided in this application, determining of the time difference between the reference time and the system time of the artificial intelligence device is added. When the time difference between the reference time and the system time of the artificial intelligence device is greater than the preset value, the system time is adjusted based on the preset step value, to implement progressive synchronization. In this way, system time hopping caused by direct alignment performed when the time difference is relatively large is avoided, accuracy of time synchronization in an artificial intelligence field is improved, and stability of intelligent control is improved.

The artificial intelligence device may include but is not limited to an intelligent vehicle, an intelligent ship, an intelligent robot, and the like.

The reference time is a reference time value for synchronization of the system time in the time synchronization apparatus. When the artificial intelligence device can normally receive the satellite timing signal transmitted by a satellite, accurate time obtained by the artificial intelligence device based on the timing signal is used as the reference time. When the artificial intelligence device cannot normally receive the satellite timing signal, the time of the internal clock of the artificial intelligence device is used as the reference time.

It should be noted that when the artificial intelligence device can normally receive the satellite timing signal transmitted by the satellite, the time of the internal clock of the artificial intelligence device may alternatively be aligned with the reference time.

The preset value is a preconfigured threshold used to determine whether hopping occurs when the reference time is directly synchronized with the system time. A value of the preset value may be configured based on an actual requirement.

The preset step value is a preconfigured time adjustment value for progressive synchronization. When the time difference between the reference time and the system time of the artificial intelligence device is greater than the preset value, the system time is adjusted to the reference time by one preset step value.

With reference to the first aspect, in a possible implementation, after the adjusting the system time based on a preset step value, the time synchronization method provided in this application further includes redetermining the time difference between the reference time and the system time of the artificial intelligence device after preset duration; and adjusting the system time based on the preset step value if the time difference is greater than the preset value. The time synchronization method provided in this application is performed for a plurality of times by setting the preset duration, to implement progressive synchronization.

With reference to the first aspect and any one of the foregoing possible implementations, in another possible implementation, the preset duration is less than or equal to a sending period of the satellite timing signal.

Optionally, the preset duration may be equal to the sending period of the satellite timing signal. In other words, a time interval of two times of performing the time synchronization method provided in this application is the same as the sending period of the satellite timing signal. Alternatively, the preset duration may be less than the sending period of the satellite timing signal. In other words, a time interval of two times of performing the time synchronization method provided in this application is greater than the sending period of the satellite timing signal, to implement fast synchronization.

With reference to the first aspect and either of the foregoing possible implementations, in another possible implementation, the time synchronization method provided in this application further includes determining whether the artificial intelligence device enters an intelligent control mode; and if the artificial intelligence device enters the intelligent control mode, determining the time difference between the reference time and the system time of the artificial intelligence device. In this way, a progressive synchronization solution is used only when the artificial intelligence device enters the intelligent control mode, so that processing efficiency is improved.

With reference to the first aspect and any one of the foregoing possible implementations, in another possible implementation, the time synchronization method provided in this application further includes synchronizing the system time with the reference time if the artificial intelligence device does not enter the intelligent control mode.

Synchronizing the system time with the reference time may be implemented as directly aligning the system time with the reference time.

With reference to the first aspect and any one of the foregoing possible implementations, in another possible implementation, the time synchronization method provided in this application further includes, if the time difference between the reference time and the system time of the artificial intelligence device is less than the preset value, synchronizing the system time with the reference time.

It should be noted that when the time difference between the reference time and the system time of the artificial intelligence device is equal to the preset value, the system time may be adjusted based on the preset step value, or the system time may be synchronized with the reference time.

With reference to the first aspect and any one of the foregoing possible implementations, in another possible implementation, the time synchronization method provided in this application may further include obtaining an initial value of the system time, where the initial value of the system time is reference time when the artificial intelligence device is started.

According to a second aspect, this application provides a time synchronization apparatus. The apparatus may be an apparatus or a chip system in an artificial intelligence device, or an apparatus that can be used together with an artificial intelligence device. The time synchronization apparatus may implement functions performed in the foregoing aspects or possible designs, and the functions may be implemented by hardware, or may be implemented by hardware by executing corresponding software. The hardware or the software includes one or more modules corresponding to the functions. For example, the time synchronization apparatus may include a determining unit and an adjustment unit.

The determining unit is configured to determine a time difference between reference time and system time of the artificial intelligence device, where the reference time is timed by an internal clock of the artificial intelligence device and is aligned based on a satellite timing signal, or the reference time is timed by an internal clock of the artificial intelligence device. The adjustment unit is configured to adjust the system time based on a preset step value if the time difference determined by the determining unit is greater than a preset value.

It should be noted that the time synchronization apparatus provided in the second aspect is configured to perform the time synchronization method provided in the first aspect. For an implementation, refer to an example implementation of the first aspect.

According to a third aspect, an embodiment of this application provides a time synchronization apparatus. The time synchronization apparatus may include a processor and a memory. The processor is coupled to the memory, and the memory may be configured to store computer program code. The computer program code includes computer instructions. When the computer instructions are executed by the time synchronization apparatus, the time synchronization apparatus is enabled to perform the time synchronization method according to the first aspect or any possible implementation.

According to a fourth aspect, an artificial intelligence device is provided, and includes the time synchronization apparatus according to any one of the foregoing aspects or possible implementations.

According to a fifth aspect, an embodiment of this application provides a computer-readable storage medium. The computer-readable storage medium may include computer software instructions. When the computer software instructions are run on a computer, the computer is enabled to perform the time synchronization method according to any one of the first aspect or the possible implementations of the first aspect.

According to a sixth aspect, an embodiment of this application provides a computer program product. When the computer program product is run on a computer, the computer is enabled to perform the time synchronization method according to any one of the first aspect of the claims or the possible implementations.

According to a seventh aspect, an embodiment of this application provides a chip system. The chip system is applied to an artificial intelligence device, and the chip system includes an interface circuit and a processor. The interface circuit is interconnected with the processor by using a line. The interface circuit is configured to receive a signal from a memory of the artificial intelligence device, and send the signal to the processor, where the signal includes computer instructions stored in the memory. When the processor executes the computer instructions, the chip system performs the time synchronization method according to any one of the first aspect or the possible implementations.

It should be understood that descriptions of technical features, technical solutions, beneficial effects, or similar words in this application do not imply that all features and advantages can be implemented in any individual embodiment. On the contrary, it may be understood that descriptions of the features or the beneficial effects mean that at least one embodiment includes a technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in embodiments may be combined in any proper manner. A person skilled in the art understands that an embodiment may be implemented without one or more technical features, technical solutions, or beneficial effects in an embodiment. In other embodiments, additional technical features and beneficial effects may be further identified in embodiments that does not reflect all embodiments.

DESCRIPTION OF EMBODIMENTS

Figure 1:
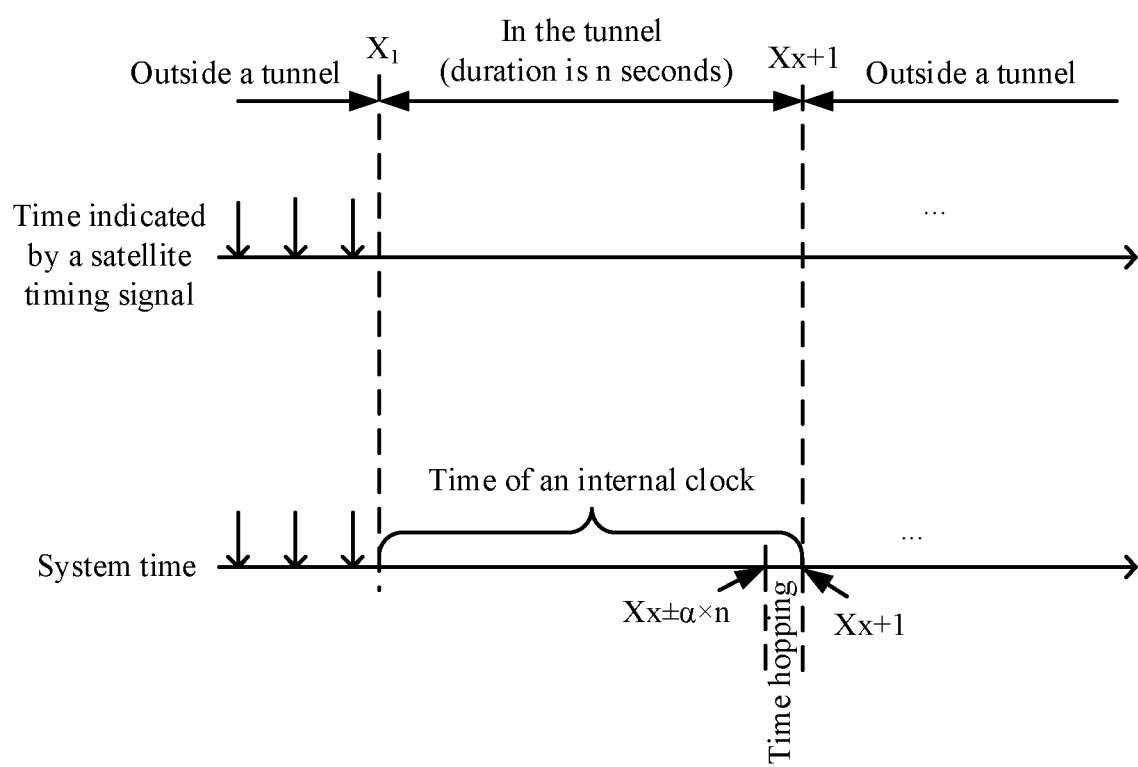
FIG. 1 is a schematic diagram of a time synchronization process in a traveling process of an artificial intelligence device.

In this specification, claims, and accompanying drawings of this application, the terms "first", "second", "third", and the like are intended to distinguish between different objects but do not limit a particular order.

In addition, in embodiments of this application, the word "example" or "for example" is used to represent giving an example, an illustration, or a description. Any embodiment or design scheme described as an "example" or with "for example" in embodiments of this application should not be explained as being more preferred or having more advantages than another embodiment or design scheme. Exactly, use of the word such as "example" or "for example" is intended to present a related concept in a manner.

For ease of understanding, terms in this application are explained first.

A satellite timing signal may be a signal that is sent by a satellite to indicate accurate time. For example, the satellite timing signal includes a time value and a pulse signal. A device that receives the satellite timing signal uses a moment of a rising edge of the pulse signal as the time value included in the satellite timing signal, to perform time synchronization. In actual application, the satellite timing signal is periodically sent. The satellite in this specification may be BEIDOU, a Global Positioning System (GPS), a GLOSNASS satellite, or the like.

The reference time may be a reference time value for synchronization of system time in a time synchronization apparatus. When the artificial intelligence device can normally receive the satellite timing signal transmitted by the satellite, accurate time obtained by the artificial intelligence device based on the timing signal is used as the reference time. When the artificial intelligence device cannot normally receive the satellite timing signal, time of an internal clock of the artificial intelligence device is used as the reference time.

The time of the internal clock is time recorded by an apparatus with a timing function deployed in the artificial intelligence device. When the artificial intelligence device can normally receive the satellite timing signal transmitted by the satellite, the time of the internal clock of the artificial intelligence device may alternatively be aligned with the reference time.

The system time is time information used when the artificial intelligence device performs intelligent control, and the system time is synchronized based on the reference time.

Currently, a solution for implementing time synchronization in the artificial intelligence device is as follows. A GNSS module in the artificial intelligence device receives a satellite timing signal sent by a satellite, to obtain accurate time as a reference signal, and directly synchronizes the system time with the reference signal. When the satellite timing signal cannot be obtained, time of an internal clock is used as the reference signal; in other words, the time of the internal clock is used as the system time. However, timing accuracy of the internal clock is insufficient. Consequently, when the satellite signal is not received in a long time, there is a relatively large time difference between the time of the internal clock and time of the satellite. When the satellite timing signal is restored, system time hopping is caused if the system time is directly synchronized with the time of the satellite. This affects stability of intelligent control.

For example, the artificial intelligence device is an intelligent vehicle, and accuracy of an internal clock of the intelligent vehicle is 50 part per million (PPM). When the intelligent vehicle is in a tunnel, an internal GNSS module cannot obtain a satellite timing signal. Time of the internal clock is used as a reference signal, and the time of the internal clock is used as the system time.

If the intelligent vehicle is in the tunnel for one minute, the satellite timing signal is lost for one minute, and a timing error of the internal clock is 60×50/1000000=3 milliseconds (ms).

If the intelligent vehicle is in the tunnel for five minutes, the satellite timing signal is lost for five minutes, and a timing error of the internal clock is 300×50/1000000=15 ms.

If the intelligent vehicle is in the tunnel for ten minutes, the satellite timing signal is lost for ten minutes, and a timing error of the internal clock is 600×50/1000000=30 ms.

If the intelligent vehicle is in the tunnel for 20 minutes, the satellite timing signal is lost for 20 minutes, and a timing error of the internal clock is 1200×50/1000000=60 ms.

It can be learned from the foregoing data that, longer time in which the artificial intelligence device cannot obtain the satellite timing signal leads to a larger timing error of the internal clock. When the satellite timing signal is restored, a hopping value caused if the system time is directly synchronized with accurate time indicated by satellite timing time is also relatively large.

Currently, accuracy of system time for intelligent control in the intelligent vehicle greatly influences a network element for intelligent control. For example, a sensor frame rate is as follows. For a camera sensor, 33 ms is one frame, and for a lidar sensor, 50 ms is one frame. If an error between the system time and actual accurate time exceeds a specific time, an intelligent control system directly considers that the sensor loses a frame and an alarm is accidentally touched or a function is abnormal. In a fused system of the intelligent vehicle, a camera is fused with a lidar frame within a specific time. If the error between the system time and the actual accurate time exceeds the specific time, the intelligent control system cannot select data, and consequently, a fusion function is abnormal. The intelligent control system calculates a positioning point by calculating/transmitting time and a speed, an acceleration, and an angular velocity. Once the system time hops, system positioning is abnormal. The intelligent control system usually performs planning control at an interval of 10 ms. If the system time hops, next delivery of planning control is abnormal.

For example, FIG. 1 shows a time synchronization process in a traveling process of an artificial intelligence device. As shown in FIG. 1, before a moment $X_1$ timed by a satellite, the artificial intelligence device is located outside a tunnel, and may obtain a satellite timing signal, and system time is synchronous with accurate time indicated by the satellite timing signal. The artificial intelligence device enters the tunnel in a second $X_1$ timed by the satellite, and exits the tunnel in a second $Xx+1$ timed by the satellite. In the tunnel, the artificial intelligence device cannot obtain the satellite timing signal, and the system time is time of an internal clock. It is assumed that traveling time of the artificial intelligence device in the tunnel is n seconds, and an accumulated error of internal timing is $\pm\alpha \times n$ seconds ($\alpha$ is accuracy of the internal clock). In a second before exiting the tunnel, that is, a second $Xx$ timed by the satellite, the system time is a second $Xx\pm\alpha \times n$. The artificial intelligence device re-obtains the satellite timing signal in the second $Xx+1$, and the system time is directly synchronized to the second $Xx+1$. The system time hops from the second $Xx\pm\alpha \times n$ to the second $Xx+1$.

Based on this, an embodiment of this application provides a time synchronization method. A time difference between reference time and system time of an artificial intelligence device is first determined, and when the time difference is greater than a preset value, the system time is synchronized with the reference time in a stepwise manner, to avoid hopping of the system time, improve accuracy of time synchronization in an artificial intelligence field, and improve stability of intelligent control.

The following describes implementations of embodiments of this application in detail with reference to the accompanying drawings.

Figure 2:
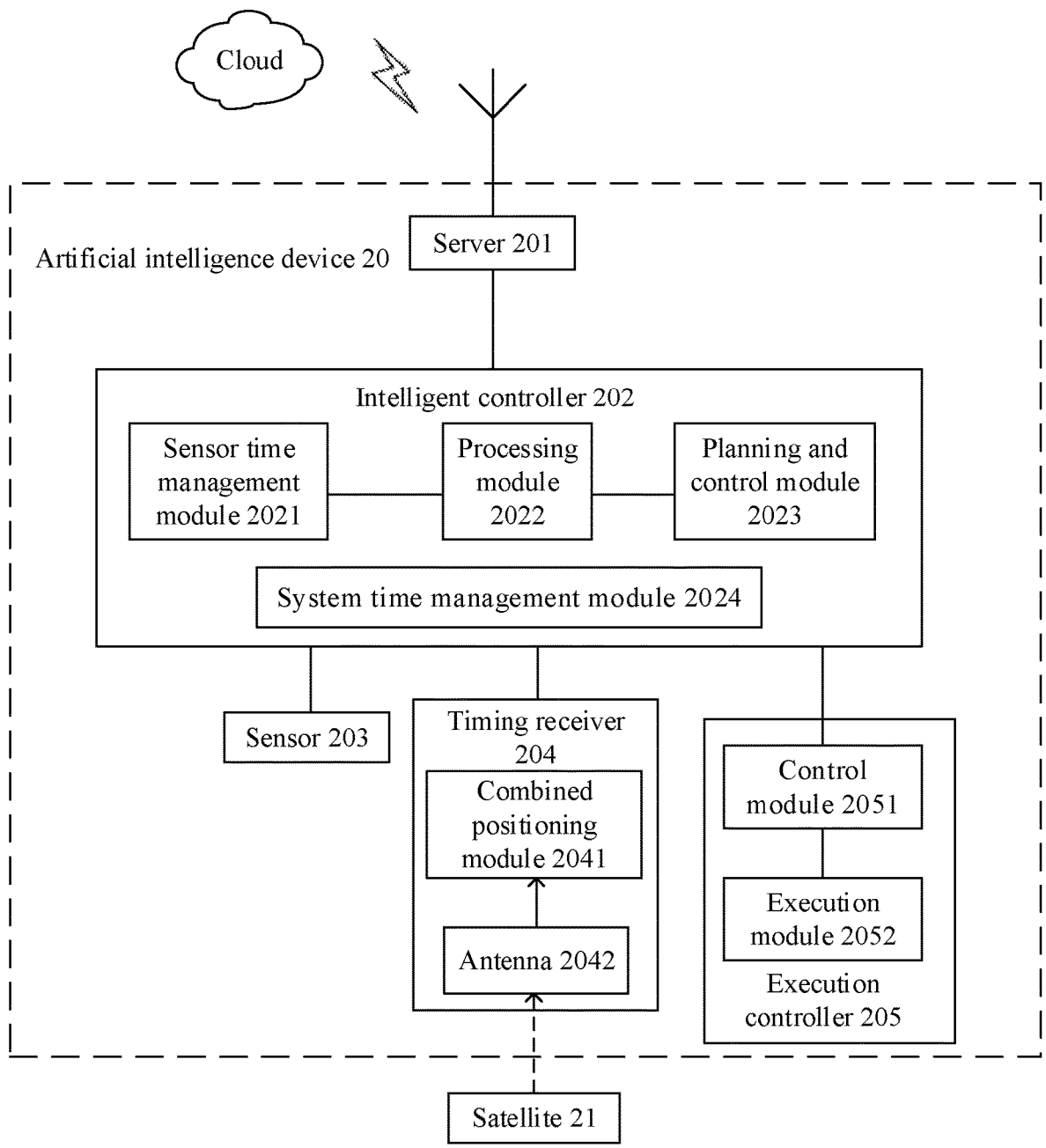
FIG. 2 is a schematic diagram of a structure of a time synchronization system according to an embodiment of this application.

A time synchronization method provided in embodiments of this application may be applied to a time synchronization system shown in FIG. 2. As shown in FIG. 2, the time synchronization system may include an artificial intelligence device 20 and a satellite 21. The satellite 21 is used for accurate timing and periodically sending a satellite timing signal, to perform time synchronization with the artificial intelligence device 20. The artificial intelligence device 20 synchronizes system time with accurate time indicated by the satellite timing signal, to perform intelligent control.

Actual product forms of the satellite and the artificial intelligence device in the time synchronization system shown in FIG. 2 are not limited.

In an example, as shown in FIG. 2, the artificial intelligence device 20 may include a server 201, an intelligent controller 202, a sensor 203, a timing receiver 204, and an execution controller 205.

The server 201 is configured to connect the artificial intelligence device 20 to the cloud by using a connection medium (e.g., wired or wireless, shown as wireless in FIG. 2), share information with another artificial intelligence device in the cloud, and cache and process related data.

The intelligent controller 202 is configured to implement an intelligent control function of the artificial intelligence device 20.

The sensor 203 is configured to collect environment data in a running process of the artificial intelligence device 20. For example, the sensor 203 may be a millimeter wave radar, a camera, an ultrasonic radar, or a lidar.

The timing receiver 204 may include a combined positioning module 2041 and an antenna 2042. The antenna 2042 is configured to receive the satellite timing signal sent by the satellite 21, and the combined positioning module 2041 obtains the accurate time based on the satellite timing signal.

The execution controller 205 may include a control module 2051 and an execution module 2052. The control module 2051 receives a control signal sent by the intelligent controller 202, and controls the execution module 2052 to implement a function of the artificial intelligence device 20.

Figure 3:
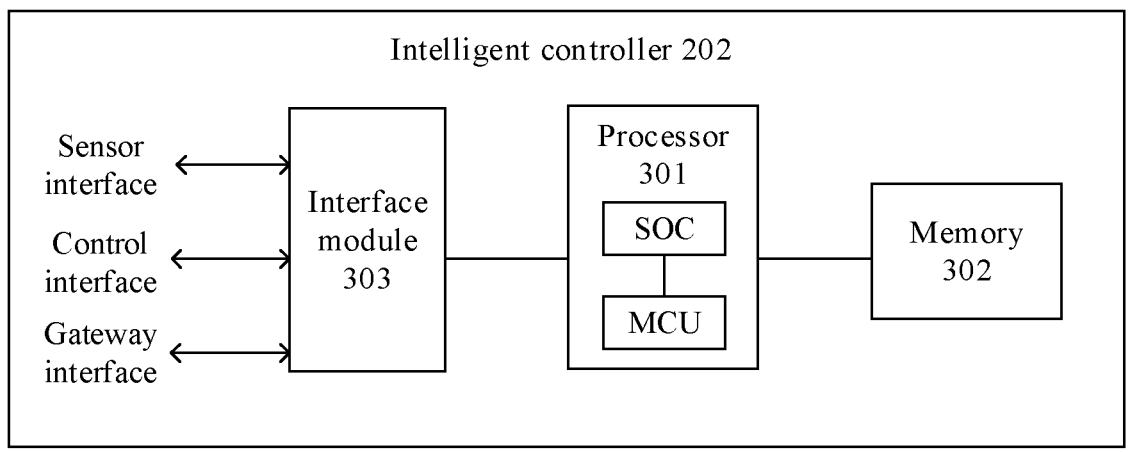
FIG. 3 is a schematic diagram of a structure of an intelligent controller according to an embodiment of this application.

An entity form of the intelligent controller 202 may be shown in FIG. 3, and includes a processor 301, a memory 302, and an interface module 303.

The processor 301 may include a system on chip (SOC) and a microcontroller unit (MCU). The memory 302 is configured to store program code, a configuration file, or other content for implementing the intelligent controller 202. The interface module 303 is configured to provide a connection interface such as a sensor interface, a controller interface, a gateway interface, or another interface for another device. In an example, the sensor interface is configured to collect data of each sensor. The controller interface is configured to receive and send a related control signal. The gateway interface is configured to implement communication between modules by using a network.

In an example, the processor 301 may perform various functions of the intelligent controller 202 by running or executing a software program and/or a module stored in the memory 302 and invoking data stored in the memory 302.

As shown in FIG. 2, the intelligent controller 202 may include a sensor time management module 2021, a processing module 2022, a planning and control module 2023, and a system time management module 2024.

The system time management module 2024 may be deployed inside an MCU or an SOC of the intelligent controller 202. The sensor time management module 2021 is separately deployed inside the MCU and the SOC of the intelligent controller 202 based on an attribute of the sensor. The processing module 2022 may be deployed inside the SOC of the intelligent controller 202. The planning and control module 2023 may be deployed inside the MCU or the SOC of the intelligent controller 202.

The system time management module 2024 is responsible for overall system time management of the artificial intelligence device 20, including time management of the controller and the sensor.

The sensor time management module 2021 is mainly responsible for data timestamp management of each frame of the sensor.

The processing module 2022 may be responsible for receiving the data collected by the sensor 203, and analyzing the data to obtain the environment information, to guide planning and control of the artificial intelligence device 20.

The planning and control module 2023 is mainly configured to make a behavior decision based on information provided by the processing module 2022, generate a control instruction, and transmit the control instruction to the execution controller 205.

An intelligent vehicle is used as an example of the artificial intelligence device 20 below to describe in detail functions of the components of the artificial intelligence device 20.

Figure 4:
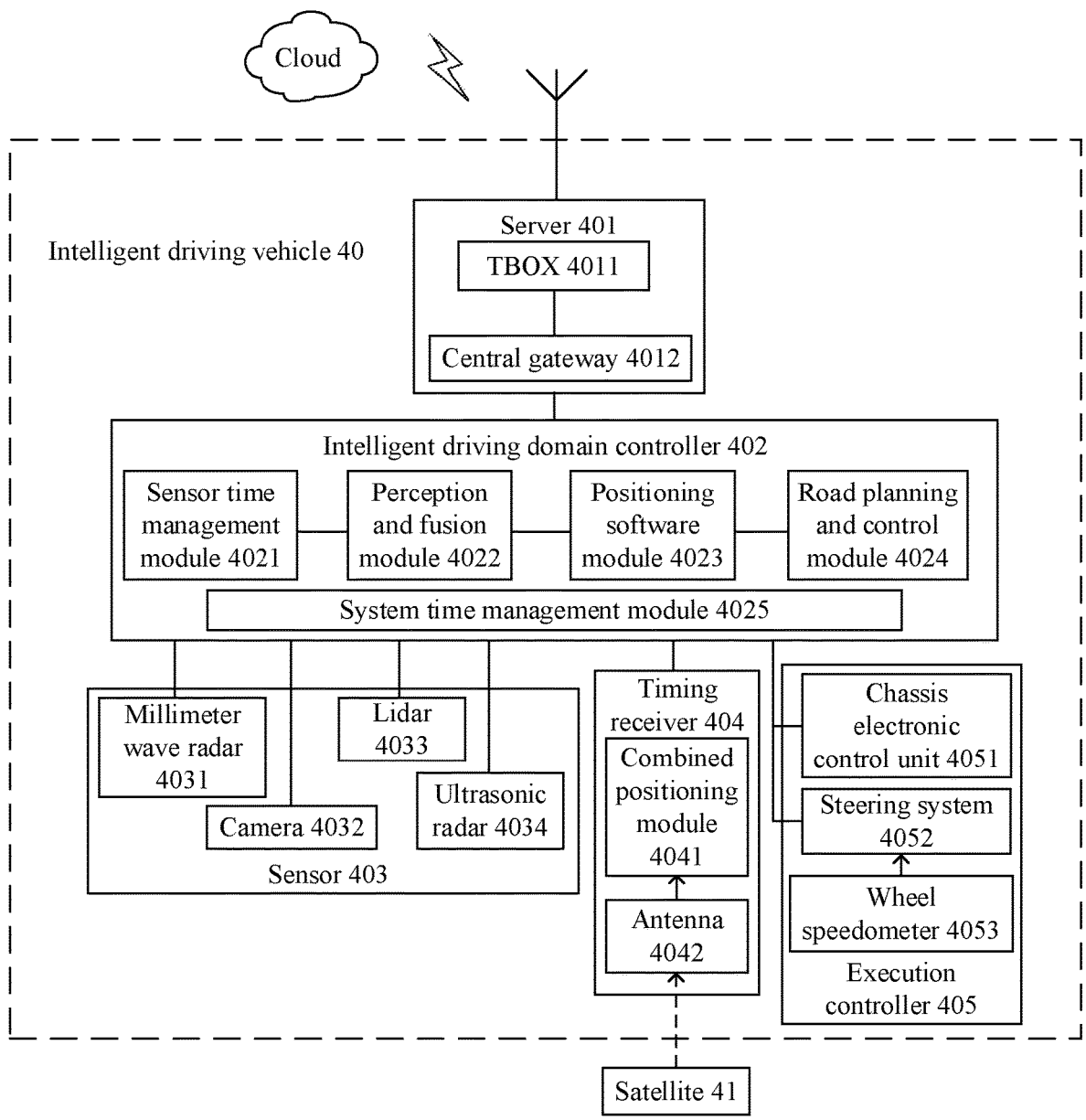
FIG. 4 is a schematic diagram of a system architecture in an intelligent driving scenario according to an embodiment of this application.

FIG. 4 is a schematic diagram of a system architecture in an intelligent driving scenario according to an embodiment of this application. As shown in FIG. 4, the system architecture may include an intelligent driving vehicle 40 and a satellite 41.

The intelligent driving vehicle 40 may include a server 401, an intelligent driving domain controller 402, a sensor 403, a timing receiver 404, and an execution controller 405. The server 401, the intelligent driving domain controller 402, the sensor 403, the timing receiver 404, and the execution controller 405 are deployed inside an intelligent driving system. The satellite 41 may be a GNSS global satellite navigation system, and includes a GLOSNASS, a GPS, and BEIDOU.

In an example, in an intelligent driving scenario, the server 201 in FIG. 2 may be the server 401 in FIG. 4. As shown in FIG. 4, the server 401 may include a telematics box (TBOX) 4011 and a central gateway 4012.

The intelligent controller 202 in FIG. 2 may be the intelligent driving domain controller 402 in FIG. 4. As shown in FIG. 4, the intelligent driving domain controller 202 may include a sensor time management module 4021, a perception and fusion module 4022, a positioning software module 4023, a road planning and control module 4024, and a system time management module 4025.

The sensor 203 in FIG. 2 may be the sensor 403 in FIG. 4. As shown in FIG. 4, the sensor 403 may include a millimeter wave radar 4031, a camera 4032, a lidar 4033, and an ultrasonic radar 4034.

The timing receiver 204 in FIG. 2 may be the timing receiver 404 in FIG. 4. As shown in FIG. 4, the timing receiver 404 may include a combined positioning module 4041 and an antenna 4042.

The execution controller 205 in FIG. 2 may be the execution controller 405 in FIG. 4. As shown in FIG. 4, the execution controller 405 may include a chassis electronic control unit 4051, a steering system 4052, and a wheel speedometer 4053.

The TBOX 4011 is mainly responsible for storing and processing cloud data received by the intelligent driving vehicle 40.

The central gateway 4012 is mainly responsible for communication between the intelligent driving vehicle 40 and the cloud.

The sensor time management module 4021 is mainly responsible for data timestamp management of each frame of the sensor 403.

The perception and fusion module 4022 is divided into two parts, such as, for example, perception and fusion. Perception is mainly responsible for intelligent analysis of lidar point cloud data and camera image frame data that are input by a preprocessing module, and implements functions such as static/dynamic target object detection and tracking, lane line identification, traffic light identification, and obstacle identification. A fusion unit is configured to receive an obstacle list, depth information, lane line information, and travelable area information from a perception module, output obstacle state estimation and track prediction in a range of interest through smoothing processing, and output a final travelable area and obstacle information to a planning decision making unit.

The positioning software module 4023 is mainly responsible for receiving road feature information provided by the perception and fusion module, and outputting spatial positioning and posture information of the vehicle with reference to the GNSS and wheel speedometer fusion positioning information and high-precision map information.

The road planning and control module 4024 mainly makes a behavior decision based on the travelable area information, the positioning information, and the obstacle information that are provided by the perception and fusion module 4022 and the positioning software module 4023 and real-time motion information of the vehicle, including horizontal and vertical motion control and planning; and generates a control instruction (including a brake, a throttle, a steering wheel, a gear, a steering lamp, and the like) based on motion control and planning and a given speed.

The system time management module 4025 is mainly responsible for overall time management of a driving system, including time management of the controller and the sensor.

The camera 4032 is mainly responsible for collecting picture information in an environment.

The millimeter wave radar 4031, the lidar 4033, and the ultrasonic radar 4034 are mainly responsible for collecting object information in the environment.

The antenna 4042 is mainly responsible for receiving a timing signal transmitted by the satellite.

The combined positioning module 4041 is mainly responsible for obtaining accurate time based on the satellite timing signal.

The chassis electronic control unit 4051 is mainly responsible for receiving a control signal sent by the intelligent driving domain controller 402, and controlling the steering system 4052.

The steering system 4052 is mainly responsible for performing an action based on an instruction of the chassis electronic control unit 4051.

The wheel speedometer 4053 is mainly responsible for detecting and controlling a rotational speed of a wheel.

A time synchronization procedure of the system architecture shown in FIG. 4 is as follows. The satellite 41 sends a satellite timing signal to the intelligent driving vehicle 40. After receiving the satellite timing signal, the antenna 4042 in the timing receiver 404 in the system of the intelligent driving vehicle 40 transmits received satellite timing information to the combined positioning module 4041 in the timing receiver 404. The combined positioning module 4041 obtains, through parsing, accurate time indicated by the satellite timing information, and sends the accurate time to the system time management module 4025 in the intelligent driving domain controller 402 as system time. The system time is used in each module in the intelligent driving domain controller 402 for time management and intelligent control.

In an example, the sensor time management module 4021 performs data timestamp management for each frame of each sensor (the millimeter wave radar 4031, the camera 4032, the lidar 4033, and the ultrasonic radar 4034) based on the system time. The perception and fusion module 4022 performs intelligent analysis on input point cloud data and image frame data, completes functions such as static/dynamic target object monitoring and tracking, lane line identification, traffic light identification, and obstacle identification with reference to the system time, and outputs obstacle status estimation, track prediction, and a travelable area in a range of interest. The positioning software module 4023 outputs spatial positioning and posture information of the vehicle by combining received road feature information provided by the perception and fusion module with the positioning information and the high-precision map information. The road planning and control module 4024 makes a behavior decision based on the travelable area information, the positioning information, and the obstacle information that are provided by the fusion unit and the positioning unit and the real-time motion information of the vehicle, including horizontal and vertical motion control and planning; and generates a control instruction (including a brake, a throttle, a steering wheel, a gear, a steering lamp, and the like) based on motion control and planning and a given speed. The generated control instruction is sent to the execution controller 405, and the chassis electronic control unit 4051 in the execution controller 405 controls the steering system 4052 and the like.

The following describes embodiments of this application in detail with reference to the accompanying drawings.

Figure 5:
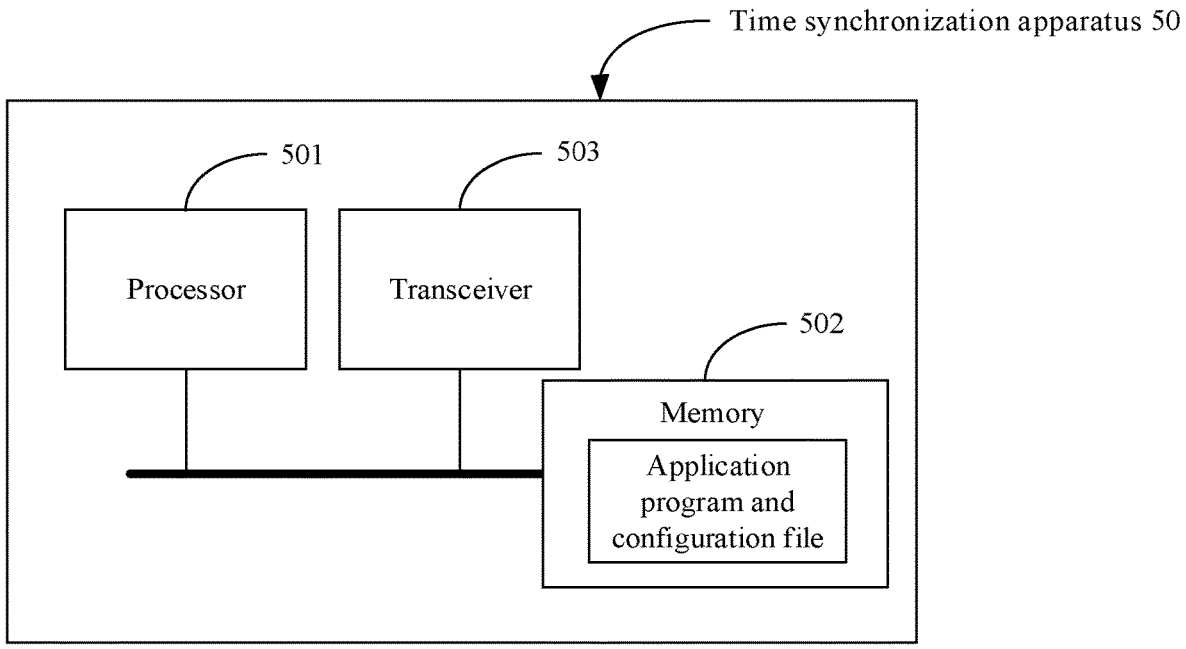
FIG. 5 is a schematic diagram of a structure of a time synchronization apparatus according to an embodiment of this application.

According to one aspect, an embodiment of this application provides a time synchronization apparatus configured to perform the time synchronization method provided in this application. The time synchronization apparatus may be deployed in the artificial intelligence device in the time synchronization system shown in FIG. 2. FIG. 5 shows a time synchronization apparatus 50 related to embodiments of this application. As shown in FIG. 5, the time synchronization apparatus 50 may include a processor 501, a memory 502, and a transceiver 503.

Components of the time synchronization apparatus 50 are described below with reference to FIG. 5.

The memory 502 may be a volatile memory, such as a random access memory (RAM); or a nonvolatile memory, such as a read-only memory (ROM), a flash memory, a hard disk drive (HDD), or a solid-state drive (SSD), or a combination of the foregoing types of memories configured to store program code, a configuration file, or other content that can implement the method in this application.

The processor 501 is a control center of the time synchronization apparatus 50. For example, the processor 501 may be a central processing unit (CPU), or may be an application specific integrated circuit (ASIC), or may be configured as one or more integrated circuits implementing embodiments of this application, for example, one or more microprocessors (DSP), or one or more field programmable gate arrays (FPGA).

The transceiver 503 is configured to communicate with another device.

The processor 501 performs the following functions by running or executing an application program and a configuration file and/or a module that are stored in the memory 502, and/or by invoking data stored in the memory 502 determining a time difference between reference time and system time of an artificial intelligence device, where the reference time is timed by an internal clock of the artificial intelligence device and is aligned based on a satellite timing signal, or the reference time is timed by an internal clock of the artificial intelligence device; and adjusting the system time based on a preset step value if the time difference is greater than a preset value.

According to another aspect, an embodiment of this application provides a time synchronization method. The time synchronization method is performed by the foregoing time synchronization apparatus, and the time synchronization apparatus may be deployed in the foregoing artificial intelligence device.

Figure 6:
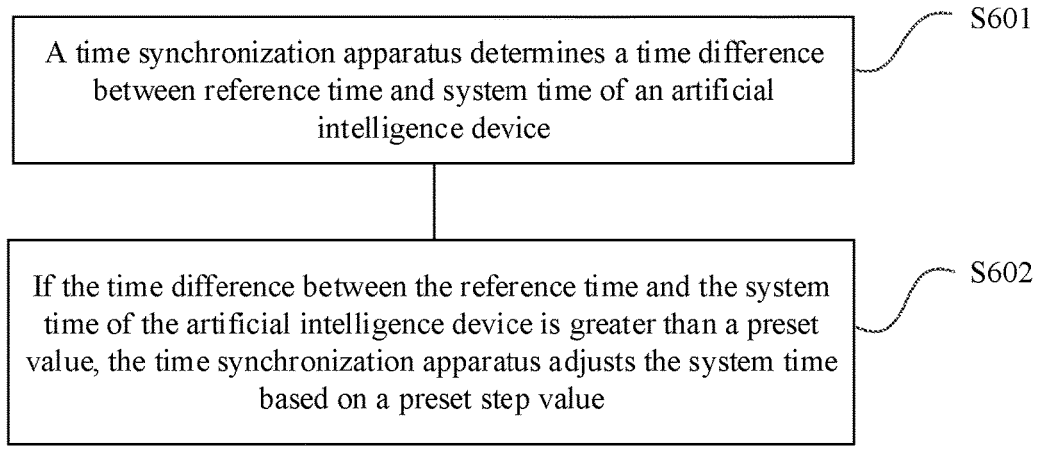
FIG. 6 is a schematic flowchart of a time synchronization method according to an embodiment of this application.

As shown in FIG. 6, the time synchronization method provided in this embodiment of this application may include the following steps.

S601: A time synchronization apparatus determines a time difference between reference time and system time of an artificial intelligence device.

The reference time is timed by an internal clock of the artificial intelligence device and is aligned based on a satellite timing signal, or the reference time is timed by an internal clock of the artificial intelligence device.

In an example, the reference time is a reference time value for synchronization of the system time in the time synchronization apparatus. When the artificial intelligence device can normally receive the satellite timing signal transmitted by a satellite, accurate time obtained by the artificial intelligence device based on the timing signal is used as the reference time. When the artificial intelligence device cannot normally receive the satellite timing signal, the time of the internal clock of the artificial intelligence device is used as the reference time.

For example, it is assumed that the time synchronization apparatus performs S601 at a moment A. The time synchronization apparatus calculates a difference between reference time at the moment A and system time at the moment A to obtain a time difference C between the reference time and the system time of the artificial intelligence device.

S602: If the time difference between the reference time and the system time of the artificial intelligence device is greater than a preset value, the time synchronization apparatus adjusts the system time based on a preset step value.

The preset step value is less than the preset value. The preset value is a preconfigured threshold used to determine whether hopping occurs when the reference time is directly synchronized with the system time. In actual application, a value of the preset value may be configured based on an actual requirement.

For example, the preset value may be a fixed value that is set by a user based on experience, or the preset value may be calculated based on a minimum tolerance time variation value of each module in a system.

The preset step value is each preconfigured time adjustment value for progressive synchronization. When the time difference between the reference time and the system time of the artificial intelligence device is greater than the preset value, the system time is adjusted to the reference time by one preset step value.

In a possible implementation, the user may set a fixed preset step value based on experience.

In another possible implementation, the preset step value may be a dynamic value calculated based on the time difference obtained in S601. A calculation manner may be performing calculation based on a preset expression, and the preset expression may be a linear expression or another expression. This is not limited in this embodiment of this application.

For example, it is assumed that the preset value is $\beta$, and the preset step value is $\gamma$. If the time difference C obtained by the time synchronization apparatus in S601 is greater than $\beta$, in S602, the time synchronization apparatus may adjust the system time at the moment A to the reference time at the moment A by $\gamma$. The adjustment described herein may be "increase" or "decrease". When the system time at the moment A is earlier than the reference time at the moment A, in S602, the time synchronization apparatus may increase the system time at the moment A by $\gamma$. When the system time at the moment A is later than the reference time at the moment A, in S602, the time synchronization apparatus may decrease the system time at the moment A by γ.

It should be noted that when the artificial intelligence device is started, the system time may be initialized to obtain an initial value of the system time. The initial value of the system time is reference time when the artificial intelligence device is started.

According to the time synchronization method provided in this application, determining of the time difference between the reference time and the system time of the artificial intelligence device is added. When the time difference between the reference time and the system time of the artificial intelligence device is greater than the preset value, the system time is adjusted based on the preset step value, to implement progressive synchronization. In this way, system time hopping caused by direct alignment performed when the time difference is relatively large is avoided, accuracy of time synchronization in an artificial intelligence field is improved, and stability of intelligent control is improved.

Figure 7:
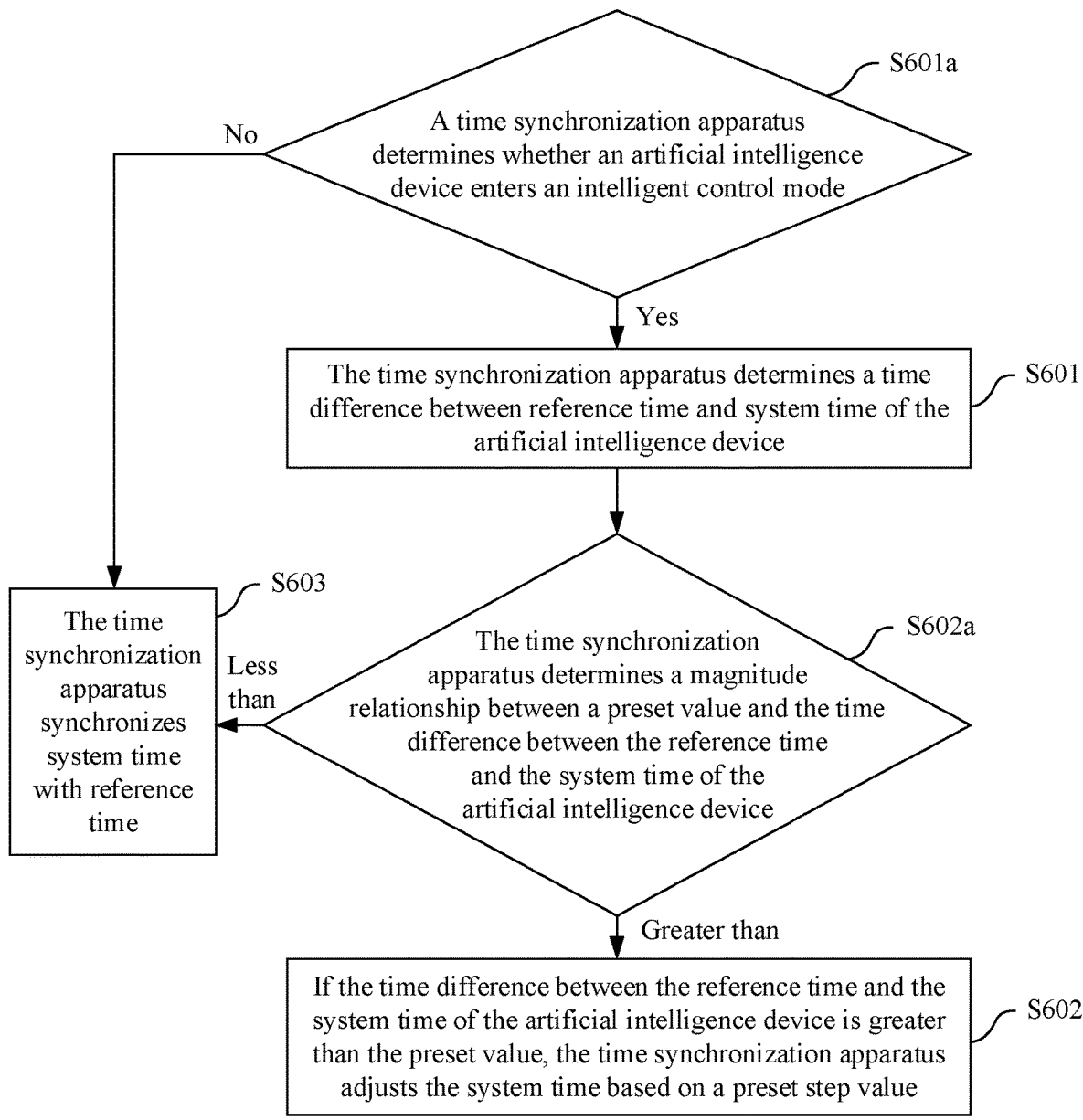
FIG. 7 is a schematic flowchart of another time synchronization method according to an embodiment of this application.

Further, before S602, as shown in FIG. 7, the time synchronization method provided in this embodiment of this application may further include S602a.

S602a: The time synchronization apparatus determines a magnitude relationship between the preset value and the time difference between the reference time and the system time of the artificial intelligence device.

The magnitude relationship includes "greater than", "equal to", or "less than".

Optionally, if it is determined in S602a that the time difference between the reference time and the system time of the artificial intelligence device is greater than the preset value, S602 is performed; if it is determined in S602a that the time difference between the reference time and the system time of the artificial intelligence device is less than the preset value, S603 is performed; or if it is determined in S602a that the time difference between the reference time and the system time of the artificial intelligence device is equal to the preset value, S602 or S603 is performed.

S603: The time synchronization apparatus synchronizes the system time with the reference time.

That the time synchronization apparatus synchronizes the system time with the reference time in S603 may be implemented as follows. The time synchronization apparatus uses the reference time as the system time.

For example, it is assumed that the preset value is β. If the time difference C obtained by the time synchronization apparatus in S601 is less than β, in S602, the time synchronization apparatus may use the reference time at the moment A as the system time at the moment A.

Further, before S601, as shown in FIG. 7, the time synchronization method provided in this embodiment of this application may further include S601a.

S601a: The time synchronization apparatus determines whether the artificial intelligence device enters an intelligent control mode.

In an example, in S601a, the time synchronization apparatus may query status information recorded by the artificial intelligence device, to determine whether the artificial intelligence device enters the intelligent control mode.

Optionally, if the time synchronization apparatus determines, in S601a, that the artificial intelligence device enters the intelligent control mode, S601 is performed; or if the time synchronization apparatus determines, in S601a, that the artificial intelligence device does not enter the intelligent control mode, the time synchronization apparatus directly performs S603 to synchronize the system time with the reference time.

It should be noted that the time synchronization apparatus may perform, for a plurality of times, the time synchronization method provided in this embodiment of this application. Operations in all times of execution are the same, but only system time and reference time in all times of execution are currently the latest. Details are not described again.

In an example, after S602 or S603, the time synchronization apparatus may re-perform S601 or S601a and subsequent steps to perform next synchronization. When S601 is re-performed, the system time and the reference time for calculating the time difference are the system time and the reference time in S601.

For example, after S602, the time synchronization apparatus may re-perform, after preset duration, S601 or S601a and subsequent steps to perform next synchronization.

The preset duration may be less than or equal to a sending period of the satellite timing signal.

Optionally, the preset duration is equal to the sending period of the satellite timing signal. In other words, a time interval of two times of performing the time synchronization method provided in this application is the same as the sending period of the satellite timing signal. For example, the sending period of the satellite timing signal may be once per second, and in this case, the preset duration may be one second.

Optionally, the preset duration is less than the sending period of the satellite timing signal. In other words, a time interval of two times of performing the time synchronization method provided in this application is greater than the sending period of the satellite timing signal, to implement fast synchronization. For example, the sending period of the satellite timing signal may be once per second, and the preset duration may be 100 milliseconds.

It should be noted that when the preset duration is less than the sending period of the satellite timing signal, a value of the preset duration may be configured based on an actual requirement. This is not limited in this embodiment of this application.

An intelligent vehicle is used as an example of the artificial intelligence device below to describe, with reference to a specific intelligent driving scenario, the time synchronization method provided in this embodiment of this application.

Figure 8:
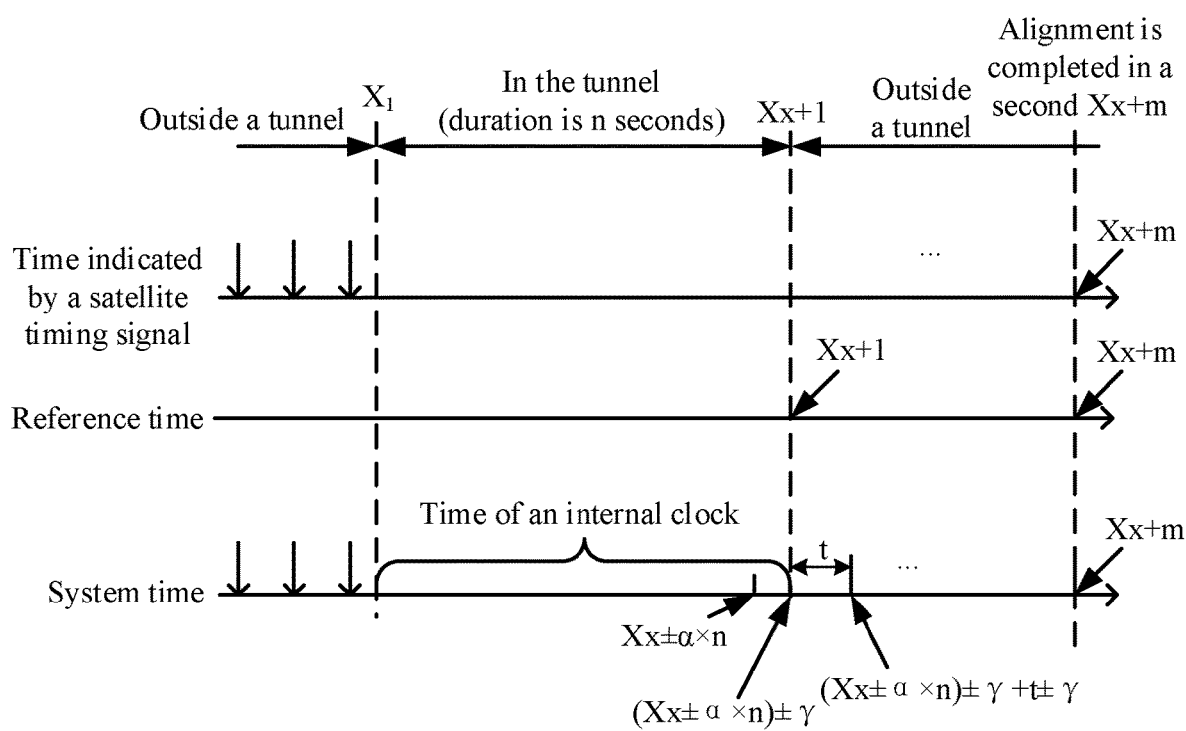
FIG. 8 is a schematic diagram of a time synchronization process in a traveling process of an intelligent vehicle according to an embodiment of this application.

FIG. 8 shows a time synchronization process in a traveling process of an intelligent vehicle. As shown in FIG. 8, before a moment $X_1$ timed by a satellite, the intelligent vehicle is located outside a tunnel, and may obtain a satellite timing signal, and system time is synchronous with accurate time indicated by the satellite timing signal. The intelligent vehicle enters the tunnel in a second $X_1$ timed by the satellite, and exits the tunnel in a second Xx timed by the satellite. In the tunnel, the artificial intelligence device cannot obtain the satellite timing signal, and system time is time of an internal clock. It is assumed that traveling time of the artificial intelligence device in the tunnel is n seconds, and an accumulated error of internal timing is ±α×n seconds (α is accuracy of the internal clock). In a second Xx, the system time is a second Xx±α×n.

The intelligent vehicle re-obtains the satellite timing signal in a second Xx+1 timed by the satellite. In this case, reference time is the second Xx+1, and the system time is the second (Xx±α×n). A time synchronization apparatus deployed in the intelligent vehicle performs the time synchronization method provided in this application, determines a time difference between the reference time, namely, the second Xx+1, and the system time (Xx±α×n), and determines a magnitude relationship between the time difference and a preset value β.

If the time synchronization apparatus determines that the time difference is greater than the preset value β, as shown in FIG. 8, the time synchronization apparatus adjusts the system time from (Xx±α×n) to the reference time, namely, the second Xx+1, by γ, and adjusts the system time to (Xx±α×n)±γ. After preset duration t, the time synchronization apparatus provided in this application redetermines a time difference between reference time, namely, a second Xx+t, and system time (Xx±α×n)±γ+t, determines a magnitude relationship between the time difference and the preset value β, and if the time difference is greater than the preset value β, adjusts the system time from (Xx±α×n)±γ+t to the reference time, namely, the second Xx+t, by γ. In a second Xx+m, the time synchronization apparatus determines that a time difference between reference time, namely, the second Xx+m, and system time at this moment is less than the preset value β, and the time synchronization apparatus synchronizes the system time to the reference time, namely, the second Xx+m.

t may be less than or equal to a sending period of the satellite timing signal.

The foregoing describes, mainly from a perspective of the artificial intelligence device, the solutions provided in embodiments of this application. It may be understood that, to implement the foregoing functions, the artificial intelligence device includes a corresponding hardware structure and/or a corresponding software module that perform various functions. A person of ordinary skill in the art should easily be aware that, in combination with the examples described in embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the artificial intelligence device may be divided into function modules based on the foregoing method examples. For example, each function module corresponding to each function may be obtained through division, or two or more functions may be integrated into one processing module. The integrated module may be implemented in a form of hardware, or may be implemented in a form of a software functional module. It should be noted that, in embodiments of this application, module division is an example, and is merely a logical function division. In an actual implementation, another division manner may be used.

Figure 9:
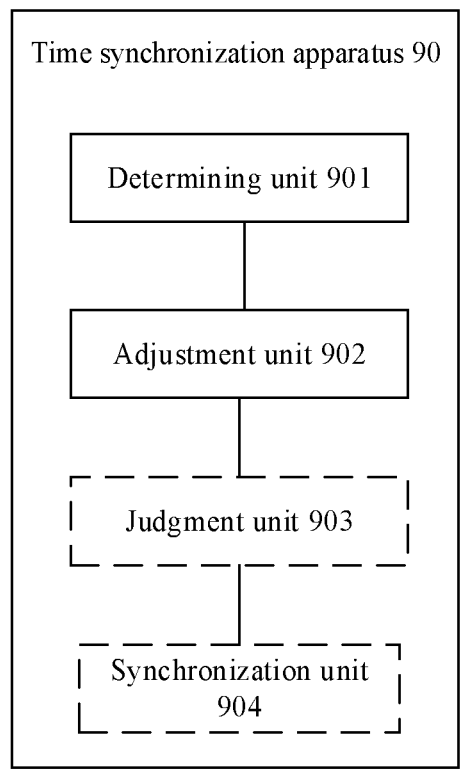
FIG. 9 is a schematic diagram of a structure of a time synchronization apparatus according to an embodiment of this application.

When each function module is obtained through division by using corresponding functions, FIG. 9 shows a time synchronization apparatus 90 according to an embodiment of this application, and the time synchronization apparatus 90 is configured to implement a function of the artificial intelligence device in the foregoing method. The time synchronization apparatus 90 may be an apparatus in the artificial intelligence device, or may be an apparatus that can be used together with the artificial intelligence device. The time synchronization apparatus 90 may alternatively be a chip system. In this embodiment of this application, the chip system may include a chip, or may include a chip and another discrete component. As shown in FIG. 9, the time synchronization apparatus 90 may include a determining unit 901 and an adjustment unit 902. The determining unit 901 is configured to perform S601 in FIG. 6 or S601 in FIG. 7, and the adjustment unit 902 is configured to perform S602 in FIG. 6 or S602 in FIG. 7. All related content of the steps in the foregoing method embodiments may be cited in function descriptions of corresponding function modules. Details are not described herein again.

Further, as shown in FIG. 9, the time synchronization apparatus 90 may further include a judgment unit 903 configured to perform step S601a in FIG. 7, and may further include a synchronization unit 904 configured to perform step S603 in FIG. 7.

Figure 10:
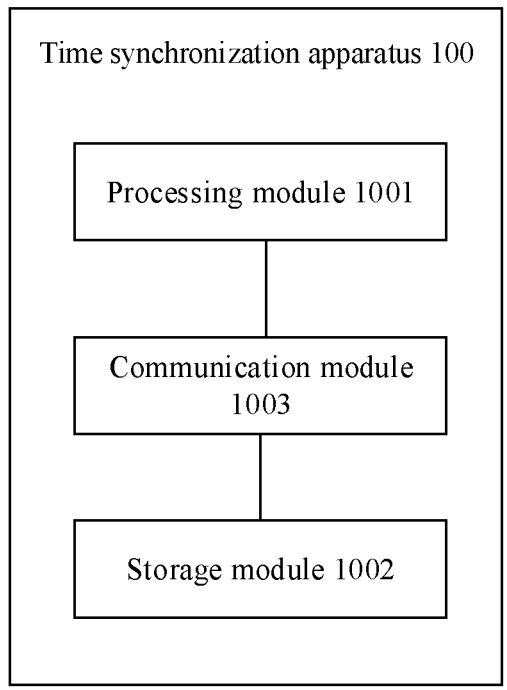
FIG. 10 is a schematic diagram of a structure of another time synchronization apparatus according to an embodiment of this application.

FIG. 10 shows a time synchronization apparatus 100 according to an embodiment of this application, and the time synchronization apparatus 100 is configured to implement a time synchronization function of the artificial intelligence device in the foregoing method. The time synchronization apparatus 100 may be an apparatus in the artificial intelligence device, or may be an apparatus that can be used together with the artificial intelligence device. The time synchronization apparatus 100 may be a chip system. The time synchronization apparatus 100 includes at least one processing module 1001 configured to implement a time synchronization function of the artificial intelligence device in the methods provided in embodiments of this application. For example, the processing module 1001 may be configured to perform processes S601, S601a, S602, S602a, and S603 in FIG. 6 or FIG. 7. For details, refer to detailed descriptions in the method examples. Details are not described herein again.

The time synchronization apparatus 100 may further include at least one storage module 1002 configured to store program instructions and/or data. The storage module 1002 is coupled to the processing module 1001. The coupling in this embodiment of this application may be an indirect coupling or a communication connection between apparatuses, units, or modules in an electrical form, a mechanical form, or another form, and is used for information exchange between the apparatuses, the units, or the modules. The processing module 1001 may cooperate with the storage module 1002. The processing module 1001 may execute the program instructions stored in the storage module 1002. At least one of the at least one storage module may be included in the processing module.

The time synchronization apparatus 100 may further include a communication module 1003 configured to communicate with another device by using a transmission medium, so that an apparatus used in the time synchronization apparatus 100 may communicate with another device.

When the processing module 1001 is a processor, the storage module 1002 is a memory, and the communication module 1003 is a transceiver, the time synchronization apparatus 100 in FIG. 10 in this embodiment of this application may be the time synchronization apparatus shown in FIG. 5.

As described above, the time synchronization apparatus 90 or the time synchronization apparatus 100 provided in embodiments of this application may be configured to implement functions of the electronic device in the methods implemented in embodiments of this application. For ease of description, only a part related to embodiments of this application is shown. For technical details that are not disclosed, refer to embodiments of this application.

Some other embodiments of this application further provide a computer-readable storage medium. The computer-readable storage medium may include computer software instructions. When the computer software instructions are run on an artificial intelligence device, the electronic device is enabled to perform the steps performed by the artificial intelligence device in the foregoing embodiment shown in FIG. 6 or FIG. 7.

Some other embodiments of this application further provide a computer program product. When the computer program product is run on a computer, the computer is enabled to perform the steps performed by the artificial intelligence device in the foregoing embodiment shown in FIG. 6 or FIG. 7.

Some other embodiments of this application further provide a chip system, and the chip system may be applied to an artificial intelligence device. The electronic device includes a display and a camera. The chip system includes an interface circuit and a processor. The interface circuit is interconnected with the processor by using a line. The interface circuit is configured to receive a signal from a memory of the artificial intelligence device, and send the signal to the processor, where the signal includes computer instructions stored in the memory. When the processor executes the computer instructions, the chip system performs the steps performed by the electronic device in the foregoing embodiment shown in FIG. 6 or FIG. 7.

Through the foregoing descriptions about implementations, a person skilled in the art can clearly understand that, for the purpose of convenience and conciseness of description, only division of the foregoing function modules is used as an example for illustration. In actual application, the foregoing functions can be allocated to different function modules for implementation based on a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division of the modules or units is merely logical function division, and may be other division during actual implementation. For example, a plurality of units or components may be combined or may be integrated into another apparatus, or some features may be ignored or not performed. In addition, displayed or discussed mutual couplings or direct couplings or communication connections may be implemented through some interfaces. The indirect couplings or communication connections between the apparatuses or units may be implemented in electrical, mechanical, or other forms.

The units described as discrete components may or may not be physically separate, and components displayed as units may be one or more physical units, that is, may be located in one place, or may be distributed to a plurality of different places. Some or all of the units may be selected based on actual requirements to achieve the objectives of the solutions of the embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in embodiments of this application essentially, or the part contributing to the current technology, or all or some of the technical solutions may be implemented in a form of a software product. The software product is stored in a storage medium and includes several instructions for instructing a device (which may include a single-chip microcomputer, a chip, or the like) or a processor to perform all or some of the steps of the methods described in embodiments of this application. The foregoing storage medium includes any medium that can store program code, such as a Universal Serial Bus (USB) flash drive, a removable hard disk, a ROM, a RAM, a diskette, or an optical disc.

The foregoing descriptions are implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A time synchronization method, applied to a time synchronization apparatus in an artificial intelligence device, wherein the time synchronization method comprises:
   determining whether the artificial intelligence device enters an intelligent control mode;
   obtaining a time difference between reference time and system time of the artificial intelligence device responsive to determining whether the artificial intelligence device enters the intelligent control mode; and
   adjusting the system time based on a preset step value when the time difference is greater than a preset value.

2. The time synchronization method of claim 1, further comprising re-obtaining the time difference between the reference time and the system time of the artificial intelligence device after a preset duration.

3. The time synchronization method of claim 2, wherein the preset duration is less than or equal to a sending period of the satellite timing signal.

4. The time synchronization method of claim 1, further comprising obtaining the time difference between the reference time and the system time when the artificial intelligence device enters the intelligent control mode.

5. The time synchronization method of claim 1, further comprising synchronizing the system time with the reference time when the artificial intelligence device does not enter the intelligent control mode.

6. The time synchronization method of claim 1, further comprising synchronizing the system time with the reference time when the time difference is less than the preset value.

7. The time synchronization method of claim 1, wherein the reference time is timed by an internal clock of the artificial intelligence device and is aligned based on a satellite timing signal.

8. The time synchronization method of claim 1, wherein the reference time is timed by an internal clock of the artificial intelligence device.

9. A time synchronization apparatus, deployed in an artificial intelligence device, comprising:
   a non-transitory computer-readable storage medium configured to store programming instructions; and
   a processor coupled to the computer-readable storage medium that when executed by the processor cause the processor to:
      determine whether the artificial intelligence device enters an intelligent control mode;

obtain a time difference between reference time and system time of the artificial intelligence device responsive to determining whether the artificial intelligence device enters the intelligent control mode; and adjust the system time based on a preset step value when the time difference is greater than a preset value.

10. The time synchronization apparatus of claim 9, wherein the programming instructions further cause the processor to re-obtain the time difference between the reference time and the system time of the artificial intelligence device after preset duration.

11. The time synchronization apparatus of claim 10, wherein the preset duration is less than or equal to a sending period of the satellite timing signal.

12. The time synchronization apparatus of claim 9, wherein the programming instructions further cause the processor to obtain the time difference between the reference time and the system time of the artificial intelligence device when the artificial intelligence device enters the intelligent control mode.

13. The time synchronization apparatus of claim 9, wherein the programming instructions further cause the processor to synchronize the system time with the reference time when the artificial intelligence device does not enter the intelligent control mode.

14. The time synchronization apparatus of claim 9, wherein the programming instructions further cause the processor to synchronize the system time with the reference time when the time difference is less than the preset value.

15. The time synchronization apparatus of claim 9, wherein the reference time is timed by an internal clock of the artificial intelligence device and is aligned based on a satellite timing signal.

16. The time synchronization apparatus of claim 9, wherein the reference time is timed by an internal clock of the artificial intelligence device.

17. A non-transitory computer-readable storage medium comprising computer-executable instructions, when executed by a processor of a computing device, cause an apparatus to:

determine whether the artificial intelligence device enters an intelligent control mode;

obtain a time difference between reference time and system time of an artificial intelligence device responsive to determining whether the artificial intelligence device enters the intelligent control mode;

adjust the system time based on a preset step value when the time difference is greater than a preset value.

18. The non-transitory computer-readable storage medium of claim 17, wherein the computer-executable instructions further cause the apparatus to re-obtain the time difference between the reference time and the system time of the artificial intelligence device after a preset duration.

19. The non-transitory computer-readable storage medium of claim 17, wherein the computer-executable instructions, further cause the apparatus to obtain the time difference between the reference time and the system time of the artificial intelligence device when the artificial intelligence device enters the intelligent control mode.

20. The non-transitory computer-readable storage medium of claim 17, wherein the computer-executable instructions further cause the apparatus to synchronize the system time with the reference time when the artificial intelligence device does not enter the intelligent control mode.

* * * * *